United States Patent [19]

Sutara

[11] 3,976,462

[45] Aug. 24, 1976

[54] METHOD AND APPARATUS FOR BENDING GLASS SHEETS

[75] Inventor: Steve J. Sutara, Natrona Heights, Pa.

[73] Assignee: PPG Industries, Inc., Pittsburgh, Pa.

[22] Filed: Mar. 10, 1975

[21] Appl. No.: 556,745

[52] U.S. Cl. .................................. 65/107; 65/288; 65/289; 65/374 RM
[51] Int. Cl.² .......................................... C03B 23/02
[58] Field of Search ............. 65/107, 114, 287, 288, 65/289, 374 RM, 348

[56] References Cited
UNITED STATES PATENTS

| | | | |
|---|---|---|---|
| 3,741,743 | 6/1973 | Seymour | 65/287 |
| 3,837,833 | 9/1974 | Couture et al. | 65/287 X |

Primary Examiner—Arthur D. Kellogg
Attorney, Agent, or Firm—Dennis G. Millman; Edward I. Mates

[57] ABSTRACT

In bending glass sheets by the gravity sag method, the glass is supported on a rigid metal outline mold composed of one or more metal rails having a heat capacity appreciably greater than that of the glass sheet to be bent. The glass sheet portion that is in direct contact with the rail for the entire heating cycle incidental to glass sheet bending tends to break. The present invention provides a simple but effective means to reduce the incidence of glass breakage during thermal treatment incidental to bending by providing the end portions of the rail with thin sheet metal members folded thereover.

6 Claims, 6 Drawing Figures

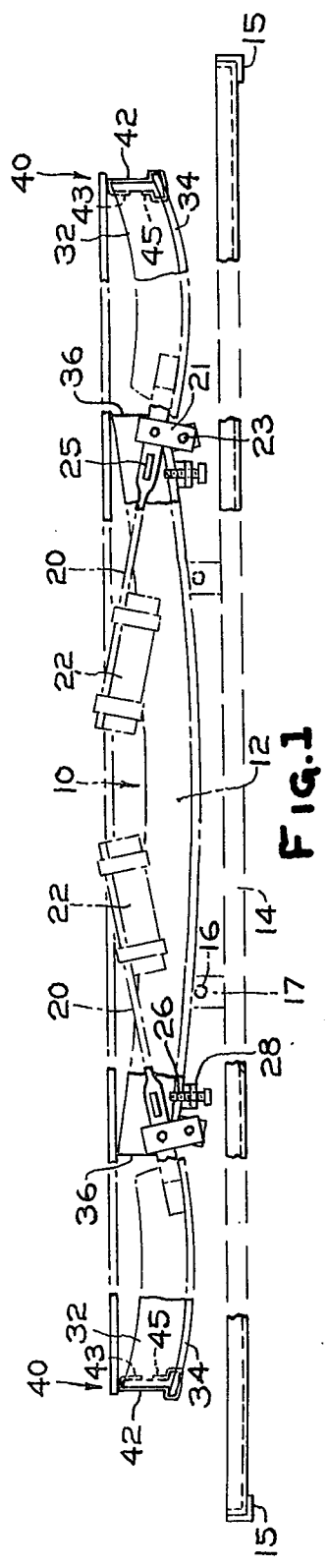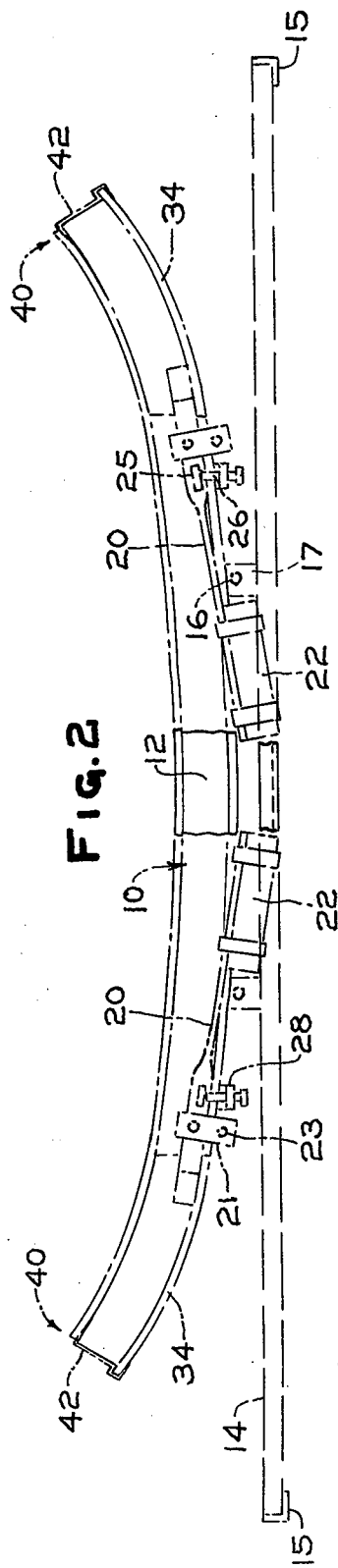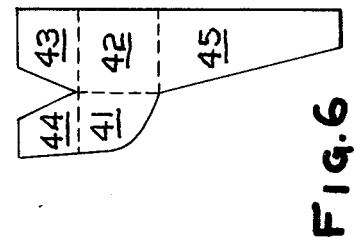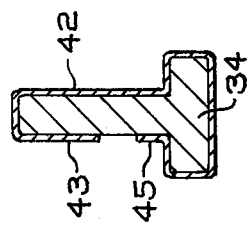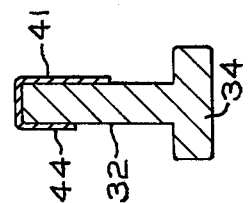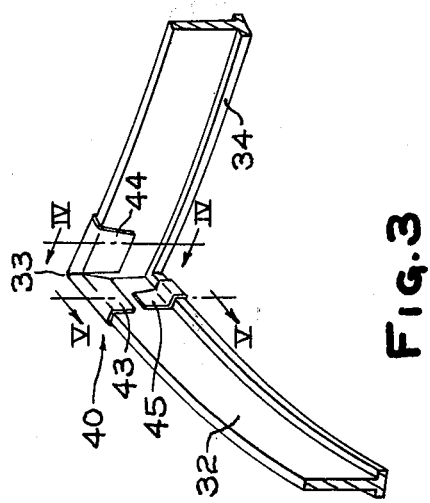

METHOD AND APPARATUS FOR BENDING GLASS SHEETS

BACKGROUND OF THE INVENTION

This invention relates to bending glass sheets by the gravity sag technique and particularly relates to a technique to be used to reduce the incidence of glass sheet breakage during a glass sheet bending operation. Glass sheets are usually bent by a gravity sagging technique in which a flat glass sheet is mounted on the sectionalized outline mold comprising a rigid metal rail disposed edgewise with its upper edge forming a surface that conforms in elevation and outline to the shape desired for the bent glass sheet. The metal rail must be sufficiently massive to maintain its shape while it supports the glass sheet at elevated temperature. Hence, the metal rail has a heat capacity per unit area greater than that of the glass sheet.

When glass sheets are shaped to relatively deep bends, the length of the chord between the ends of the bent glass is shorter than the distance between the ends of the flat glass sheet before bending. In order to reduce relative sliding between the glass ends and the metal rail which marks the glass, the mold rail comprises articulated rail sections including an end rail section whose contour conforms to the outline and shape desired for the longitudinal end portion of the glass sheet to be bent. The end rail section is constructed and arranged to pivot downward into a lower position to support the mass of a relatively stiff flat glass sheet to be bent, and when the glass sheet is softened by heat, to pivot upward into an upper position where it cooperates with additional shaping rails to form a substantially continuous outline shaping surface conforming in contour and elevation to the shape desired for the glass sheet. Making the mold rail of articulated rail sections instead of a continuous enclosed shaping rail increases the need for the rail to have greater cross-section to provide the needed structural rigidity at the glass softening temperature. Therefore, articulated metal shaping rails tend to have a heat capacity per unit area that differs from that of the supported glass sheet by an even greater amount than that of a continuous metal rail.

Depending on the shape to be imparted to the glass, the outline mold comprising articulated rail sections includes one or more end rail sections that pivot relative to an adjacent rail section between a lower position to support a flat glass sheet for bending and an upper position where it helps forms a substantially continuous outline shaping surface conforming to the shape desired for the bent glass. The end rail section is counterweighted about its pivot axis in such a manner that it tends to be in its lower position when the mold supports a flat rigid glass sheet and to pivot to its upper position when the mold supports the glass in heat-softened condition.

In order to enable the end rail section to pivot upward, the glass laden mold is subjected to a temperature cycle that comprises heating the latter to the glass softening temperature so that the end section rail pivots upward to impress its shape onto the heat-softened glass sheet while the sheet sags by gravity to conform to the shape of the mold. After the sheet is so shaped, the glass laden mold is cooled to minimize excessive sagging of the glass sheet within the outline of the mold. The shaped glass sheet so cooled is then removed from the mold, inspected and further processed.

The glass sagging technique has been the method used to bend two glass sheets simultaneously, which sheets are subsequently laminated together to form a laminated automobile windshield. The latter is curved to conform and blend into the shape of an automobile vehicle in which it is installed.

Outline glass sheet bending molds usually comprise relatively rigid massive shaping rails in the form of a T in cross-section inverted so as to support the edge of the bent glass sheet near the glass sheet periphery on the base of the stem of the T. Steel is ordinarily used for the shaping mold rails because steel rails maintain their shape throughout the temperature cycle needed for bending and annealing or bending and tempering, which temperature cycle involves a heating cycle in a bending lehr followed by a controlled cooling cycle. However, since the temperature of mold rails reacts more slowly to the change of temperature in the environment to which the glass laden molds are subjected than the glass, the glass portion in contact with the mold rail has its heating rate retarded compared to the heating rate of the portions of the glass sheet that are spaced from the metal shaping rail during the mass production bending of bent laminated windshields and other bent fabricated parts by the gravity sag technique. This establishes a thermal gradient in the glass between the shaping rail contacting portion and the glass sheet portion directly exposed to the hot atmosphere of the lehr that is steep enough to cause glass breakage.

It has been proposed to wind tapes or elongated strands twisted into cords of elongated insulating material such as fiber glass tapes and the like in order to insulate the glass sheet from direct contact with the metal shaping rail of the outline mold. However, such winding of the insulating tapes is a costly and time consuming process and since the tapes have a limited durability before they require replacement, such a solution does not appear feasible to reduce glass breakage incidental to the glass bending temperature cycle.

Another proposed solution is to apply localized heat between passes through the bending lehr to only those portions of the outline mold that contacts the glass throughout the heating cycle. This solution enables the flat glass contacting mold portions to enter the bending lehr at a sufficiently higher temperature than the glass loaded on the mold for bending so that the heat stored in the mold by the selective preheating helped to heat the local glass portions in contact with the selectively heated mold rail portions, thus reducing the steepness of the thermal gradient in the glass. However, steadily rising production rates made the time of transit of the glass laden molds through the bending and annealing lehr so short that it became impractical to heat the shaping rail portions sufficiently to have them retain enough heat to impart local heat to the glass sheet bending cycle that the resulting temperature gradient in the glass between the rail contacting portion and the remainder of the glass was sufficiently gradual to avoid the stresses that induce glass breakage during the bending. If the mold portions that contacted the glass initially were heated sufficiently to have a gradual thermal gradient at the glass softening temperature, the thermal gradient established after the glass was loaded on a mold with superheated flat glass contacting portions would be too steep to avoid glass breakage.

SUMMARY OF THE INVENTION

According to the present invention, such breakage as described previously has been reduced considerably by applying a readily applied thin sheet member to only those portions of the relatively high heat capacity metal rail that contact portions of the glass sheet throughout a sufficient portion of the temperature cycle involved in the heating phase of the bending operation to increase the likelihood of breakage in the glass sheet. According to a preferred embodiment of the present invention, a thin sheet metal member is applied in folded relation to the critical portion or portions of the outline mold rail used for gravity sag bending.

According to a preferred embodiment of the present invention, a thin metal tab is applied in folded relation to be interposed directly between a glass sheet portion susceptable to breakage and the portion of the shaping rail that is in continuous contact during the heating phase of the bending cycle. Such a metal tab is durable, and reacts to the change in temperature in the atmosphere in which the glass sheet is bent more nearly like the reaction of the glass sheet itself so as to reduce the high thermal gradient that previously existed between the portions of the glass sheet in contact with the critical portions of the mold shaping rail and the other portions of the glass sheet that did not make as long a contact or made no contact whatsoever with the mold rail throughout the heating phase of the bending operation. The thin sheet metal member that separates each critical portion of the glass sheet from direct glass to mold rail contact according to the teachings of this invention is applied to the relatively heavy mold rail in such a manner that a very thin air film remains between the thin sheet metal member and the heavy metal mold shaping rail. This thin air film is believed to play an important part in obtaining the desired results.

The invention will be understood better in the light of a description of a preferred embodiment which follows.

BRIEF DESCRIPTION OF THE DRAWINGS

In the drawings which form part of the description of a preferred embodiment and wherein like reference characters refer to like structural elements, FIG. 1 is a longitudinal elevational view of a conventional sectionalized mold for bending glass sheets by the gravity sag technique in the flat glass sheet supporting position;

FIG. 2 is a view of the mold of FIG. 1 showing a glass sheet supported in the closed mold position after the sheet has been shaped;

FIG. 3 is an enlarged perspective view looking at the inside of a corner portion of an end mold rail of the apparatus shown in FIGS. 1 and 2;

FIGS. 4 and 5 are detailed views taken along the lines IV—IV and V—V, respectively, of FIG. 3, and FIG. 6 is an enlarged flat view of a thin sheet member before it is folded over a critical portion of a mold rail according to the present invention.

Referring to the drawings, a glass bending mold 10 is shown comprising a central mold section 12 carried by a mold carrying frame 14 by means of cross rods 16 which rest at their extremities on frame support posts 17.

The mold carrying frame also is provided with a pair of end rails 15 extending transversely of the mold carrying frame 14 at the opposite longitudinal ends thereof. The rails 15 ride on successive rolls through a bending and annealing lehr wherein the glass laden molds are first heated to a temperature sufficient to heat-soften the supported glass and subsequently cooled after the glass has attained its shape.

Returning to the bending mold, the latter comprises two end mold sections 18, each of which flank the central mold section 12. Lever arms 20 having reinforcement tabs 21 are attached to each end mold section and are provided with counterweights 22 at their longitudinal inward extremities. The lever arms 20 extend longitudinally inward of the mold laterally outside the shaping rails of the central mold section 12. The bottom portions of the reinforcement tabs 21 make pivotal attachment with bearing rods 23. The latter are carried by tabs 24 that extend downward from the undersurface of the central mold section 12.

Each end mold section 18 is rotatable relative to the central mold section 12 by virtue of the pivotal connection between the reinforcement tabs 21 and the bearing rods 23. The counterweights 22 tend to rotate the end mold sections 18 about the bearing rods 23 into the closed mold position depicted in FIG. 2 from the open mold position shown in FIG. 1.

Each lever arm 20 is provided with a ledge 25 whose undersurface is engagable with an adjustable screw 26. The latter is screw threaded through an apertured angular plate 28 fixed to the center section 12. This defines the closed position of the end mold sections 18 relative to the central mold section 12 and prevents excessive rotation of the end mold sections.

The central mold section 12 comprises a pair of spaced longitudinally extending metal rails 30, each of which is of inverted T cross section and an upper edge providing an upper shaping surface along the base of the stem of the inverted T. Each end mold section 18 comprises a metal rail 32 forming at least one corner portion 33 on which a longitudinal edge portion of a flat glass sheet rests throughout the heating portion of the bending operation. The bottom edge of each rail removed from the glass is reinforced by a reinforcing member 34 that extends longitudinally of each rail 30 or 32 and forms therewith the inverted T cross section mentioned before.

The rail 30 of the central mold section 12 ends at longitudinal outward extremities 36. When flat glass sheets are mounted on the molds for bending, the end mold sections 18 are rotated to the position depicted in FIG. 1 so that the flat glass is supported at its longitudinal extremities on the corner portions 33 and intermediate its extremities on the longitudinal extremities 36 of the rails 30 of the central mold section 12. When the glass sheet is softened by the application of heat as the mold moves through a bending lehr of tunnel-like configuration, the counterweights 22 rotate the end mold sections 18 upward and inward so that the end mold section rails 32 move closer to the longitudinal extremities 36 of the central mold section rails 30 to provide a substantially continuous mold conforming in elevation and outline to the shape desired for the glass sheet at their upper surfaces.

In order to accelerate the glass sheet bending operation and to conserve fuel consumption per bent glass sheet, the counterweights 22 are made as heavy as possible to impart as large a rotational force to the end mold sections 18 as possible. Under these circumstances, the portions of the glass sheet that rest initially on the longitudinal extremities 36 of the central mold section 12 become lifted off these extremities as the center of the glass sags into conformity with the upper edges of the shaping rails 30. As the end mold sections 18 rotate upward, the corner portions 33 of the end mold section rails 32 (that intially supported the flat glass) remain in contact with the corresponding glass sheet portion throughout the bending operation.

Since the thermal capacity of the glass per unit area is much less than that of the heavy metal rails, the glass becomes heated at a faster rate of heating than the heavy metal rails in response to the heat applied to the glass-laden molds as the latter traverse the lehr in which the glass is heated for bending. Furthermore, the portion of the glass sheet in continuous contact with the rail has its heating rate modified by that of the mold shaping rails forming the corner 33 so that its rate of heating is considerably less than that of the glass sheet portion remote from the shaping rail during the heating phase of the bending operation. As a consequence, there was considerable breakage at the supported edge corners of the glass sheets undergoing bending.

The present invention provides an improvement in the bending of glass sheets and in the use of gravity sag molds used to perform such bending.

The improvement comprising the illustrative embodiment of the present invention incorporates a sheet metal member 40 folded over a corner portion 33 of an end mold section 18. The sheet metal member 40 has an outer continuous folded wall comprising outer wall portions 41 and 42, an inner slit wall having inner slit wall portions 43 and 44 and a tab portion 45 extending from outer wall portion 42. The outer wall portions face the outer surface of the corner portion 33 and are folded in the direction of the folded length of the end section rail 32 relative to the inner slit wall portions 43 and 44. Outer wall portions 41 and 42 are folded relative to one another along an axis parallel to the corner 33 to extend longitudinally of the end section rail 32 along opposite sides of the corner 33 formed on the outer mold section 18. The slit portions 43 and 44 of the inner slit wall are folded over the inner surface of the end mold section rail 32 with the slit between slit wall portions 43 and 44 aligned with the inner surface of the corner 33 and the slit wall portions 43 and 44 extending longitudinally of the end section rail 32 along opposite sides of the corner 33.

A further tab portion 45 is shown extending downwardly from the outer folded portion 42 and completely surrounding the rail reinforcement 34 to engage the inner surface of the heavy metal rail 32 below the portion engaged by the inner slit portion 43. However, tab portion 45 may extend from any of the inner or outer folded portions 41, 42, 43 or 44 around the bottom of the rail reinforcement to the opposite surface of the rail. This structural arrangement enables the sheet metal member to be interposed between the critical corner portion of the shaping surface of the end mold section 18 that engages a portion of the glass sheet throughout the bending operation and a glass sheet supported on the mold for bending. The interposition of such a sheet metal member has been found to reduce the incidence of breakage in glass sheets bent on molds so modified.

FIG. 6 shows how the thin sheet metal member 40 appears as a flat sheet prior to being folded over a critical portion of the metal mold rail. The lines of folding are depicted by the dashed lines at the boundaries between the folded portions 41 and 42 of the continuous outer wall, the portions 43 and 44 of the slit inner wall and the tab portion 45.

In a typical embodiment of the present invention, the shaping rails 30 and 32 are approximately 5 millimeters thick and approximately 40 millimeters high and the reinforcements 34 are approximately 15 millimeters wide and 5 millimeters thick. The sheet metal members folds over the critical portions of the shaping rails are from 0.2 to 0.25 millimeters thick in the preferred embodiments and extend about 25 millimeters from the corner in each direction along the length of the metal mold rail for each wall portion 41, 42, 43 and 44. The dimension of each wall portion in the direction of the rail width is about 20 millimeters and the tab 45 is sufficiently long (about 85 millimeters) to crimp around the lower portion of the metal mold rail and the bottom reinforcement and have enough left to extend upward against the inner surface of the metal mold rail. The thickness range specified is optimum for shaping a pair of glass sheets simultaneously preparatory to fabricating the bent sheets into laminated windshields that range in thickness from 5 to 6 millimeters thick for two glass sheets being shaped. The length and width of the wall portions 41 to 44 and the tab 45 are dependent on the dimensions of the metal mold rail about which they are folded.

In folding the sheet metal member over the critical portion of the metal mold rail, it is not necessary to have the sheet metal member very tightly folded as the provision of a thin air film between the folded sheet metal member and the shaping rail is helpful in obtaining the beneficial results of the present invention. However, it is understood that the sheet metal member must be thin enough so that it can be readily folded over the mold rail by hand and of a thickness such that it reacts to changes in temperature at approximately the same rate as that of the glass sheet that is mounted on the mold so as to minimize the tendency of the glass to develop a steep thermal gradient between the metal contacting portion of the supported glass sheet and the portion thereof that is exposed to air during the heating phase of a bending and annealing operation that previously caused glass breakage. Folding the sheet metal member 40 by hand around the mold rail facilitates the formation of a thin air space that insulates the thin sheet metal member from continuous direct contact with the relatively heavy metal mold rail so that the glass sheet portion separated from direct contact with the mold rail by contacting the folded sheet metal member is able to become heated at a rate of heating that approximates that of the rest of the glass sheet.

The present invention is also capable of use with a mold that comprises a unitary shaping ring of heavy metal that is not sectionalized. Each mold portion that supports the flat glass sheet for bending and continues to support the glass sheet during its heating and bending may be provided with a thin sheet metal member in the same manner as provided for the sectionalized mold of the illustrative embodiment described in detail earlier.

The form of the invention shown and described hereinbefore may be modified without departing from the gist of the invention as defined in the claimed subject matter which follows.

I claim:

1. In the art of shaping a glass sheet by gravity sagging wherein a flat glass sheet is mounted on an outline mold having an upwardly facing shaping surface of concave elevation conforming to the shape desired for the glass sheet and comprising a solid, rigidly shaped metal rail, the glass laden mold is subjected to a temperature cycle comprising heating the latter to the glass-softening temperature so that the glass sheet softens and sags to conform its shape to the shape of said mold during which heating longitudinal end portions of said supported glass sheet remain in contact with a portion of said rail for a greater portion of said heating step than other portions of said glass sheet, said metal rail having a heat capacity per unit area sufficiently greater than that of the glass sheet so that said longitudinal end portions of the glass sheet that are in direct contact with said rail portion for a greater proportion of said heating step than other portions of said glass sheet have their normal heating rate retarded sufficiently for said glass sheet portions in contact with said rail section to develop a temperature gradient relative to a glass sheet portion out of contact with said mold to tend to break said glass sheet during said temperature cycle, the improvement comprising loosely disposing a thin sheet metal member in folded relation on said rail portion only in positions to interpose said glass sheet longitudinal end portions from direct contact with said rail when said glass sheet is loaded on said mold for bending and when said glass laden mold is heated rapidly to the glass deformatiion temperature.

2. The improvement as in claim 1, wherein said glass sheet to be bent is of a configuration having a corner portion that is supported on a corner portion of the mold for substantially the entire duration of the heating portion of the glass sheet bending cycle, comprising folding said thin sheet metal member relative to said corner portion so that a portion of said member extends in each direction from said corner in facing relation to the outer and inner surfaces of said metal mold rail in folded relation to said metal mold rail.

3. Apparatus for shaping a glass sheet by gravity sagging when the glass is heat-softened, comprising: an outline mold including a heavy metal mold rail having an upper surface of concave elevation conforming to the desired curved shape for the glass sheet and oriented to support the glass sheet thereon, wherein portions of said rail surface contact the glass sheet for a greater amount of time during the shaping process than the remainder of said rail surface, thin sheet metal members loosely folded over only said glass-contacting rail surface portions so as to reduce transfer of heat between said glass sheet and the metal mold rail at said surface portions, the remainder of said upper rail surface being uncovered.

4. Apparatus as in claim 3, wherein said outline mold comprises a corner portion adapted to support a corresponding glass sheet portion throughout the heating phase of a glass sheet bending cycle, said thin metal member being folded over said corner portion of the mold in such a manner that portions of said thin metal member are disposed in folded relation over the rail portions extending in opposite directions away from said corner portion.

5. Apparatus as in claim 4 wherein said thin metal member has an outer, continuous, folded wall comprising a first outer wall portion facing the outer surface of said heavy metal mold rail to one side of said corner portion and a second outer wall portion facing the outer surface of said heavy metal mold rail to the other side of said corner portion, an inner slit wall comprising a first inner wall portion facing the inner surface of said heavy metal mold rail to one side of said corner portion and a second inner wall portion facing the inner surface of said heavy metal mold rail to the other side of said corner portion, and a tab portion connected to and extending from one of said wall portions to one of said walls around the bottom of said heavy metal mold rail and in facing relation to the surface of said heavy metal mold rail faced by a corresponding wall portion of the other of said walls.

6. Apparatus as in claim 5, wherein said heavy metal mold rail has a thickened reinforcement attached to its bottom edge and said tab portion of said thin metal member is folded around and against said thickened reinforcement between its portion facing said one surface and its portion facing said opposite surface.

* * * * *